Oct. 25, 1927.
R. L. CROSTHWAITE
VENTILATOR
Filed July 18, 1925
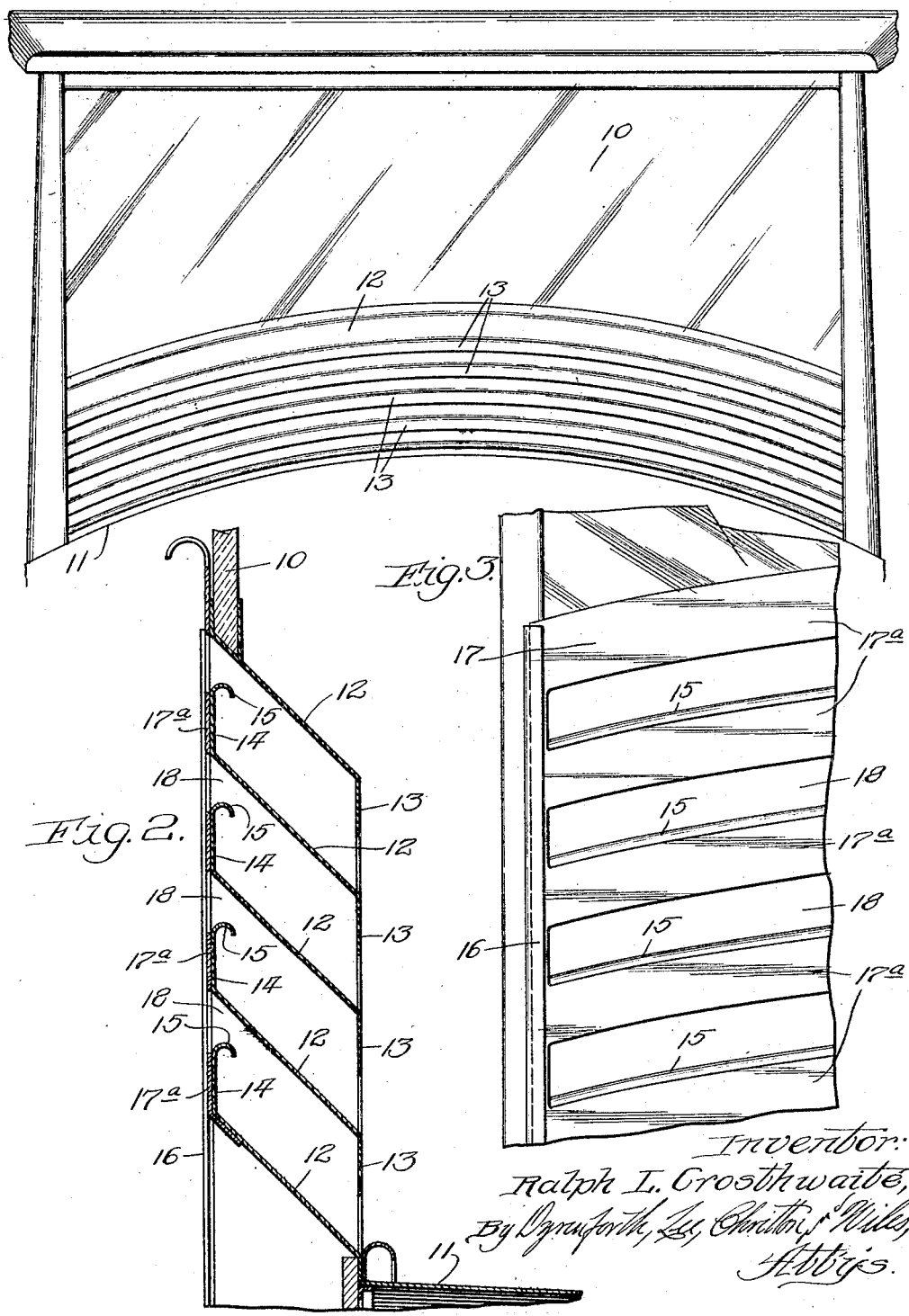

Patented Oct. 25, 1927.

1,646,853

UNITED STATES PATENT OFFICE.

RALPH L. CROSTHWAITE, OF CHICAGO, ILLINOIS.

VENTILATOR.

Application filed July 18, 1925. Serial No. 44,524.

This invention relates to improvements in ventilators and more especially to a ventilator adapted for use on motor vehicles.

One of the features of the ventilator is the provision of means for excluding rain while admitting air at the same time.

Another feature is the provision of means for adjustably varying the size of the ventilating opening. Other features and advantages of my invention will appear more fully as I proceed with my specification.

In that form of device embodying the features of my invention, shown in the accompanying drawings, Figure 1 is a view of my improved ventilator in front elevation, Fig. 2 is a vertical sectional view of the same and Fig. 3 is a fragmental view in rear elevation.

As shown in the drawings, 10 indicates the ordinary windshield glass of a motor vehicle and 11 the top of the hood or bonnet. Below the lower edge of the windshield glass and the top of the hood is placed a series of forwardly and downwardly inclined louvre boards 12, 12. Each of these boards at its forward edge has a depending apron 13. At the rear edge each of the luovre boards 12 is provided with an upwardly extending flange 14 having its upper edge curved upwardly, forwardly, and then downwardly to form a canopy as indicated by 15.

Behind the louvre slats is arranged a vertically slidable frame 17 adapted to slide in the vertical guide members 16, arranged at the sides of the windshield. This frame includes the substantially horizontally arranged curved slats 17$^a$, 17$^a$, each being substantially the same width and curved the same as the vertical flanges 14 on the rear edges of the louvre boards 12. The size of the ventilating opening may be varied by sliding the frame 17 upwardly and downwardly. When it is up as shown in Fig. 2 with the cross-strips 17$^a$ back of the flanges 14 the ventilator will be fully opened. By sliding the frame downwardly it will be seen that the strips 17$^a$ will more or less close the openings 18 between the louvre boards and thus close the ventilating opening as desired.

The aprons 13, the flanges 14 and the canopies 15 prevent the entry of rain through the ventilator.

While I have shown and described certain embodiments of my invention, it is to be understood that it is capable of many modifications. Changes, therefore, in the construction and arrangement may be made without departing from the spirit and scope of the invention as disclosed in the appended claim, in which it is my intention to claim all novelty inherent in my invention as broadly as possible in view of the prior art.

What I claim as new, and desire to secure by Letters Patent, is:

A ventilator including a series of louvre boards provided with depending aprons at their forward edges, and upwardly extending substantially vertical flanges at their rear edges, the upper edges of said flanges being curved upwardly, forwardly, and downwardly to form forwardly projecting canopies thereon, and means for varying the size of the ventilating opening comprising a slidable frame having cross members corresponding to said upwardly extending substantially vertical flanges, said frame adapted for sliding movement to move said cross members into registry with said flanges to open the ventilator or into a position to close the spaces between said flanges.

In testimony whereof I have hereunto set my hand this 16th day of July, 1925.

RALPH L. CROSTHWAITE.